US008250075B2

(12) United States Patent
Cheslow

(10) Patent No.: US 8,250,075 B2
(45) Date of Patent: Aug. 21, 2012

(54) SYSTEM AND METHOD FOR GENERATION OF COMPUTER INDEX FILES

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 928 days.

(21) Appl. No.: 11/644,039

(22) Filed: Dec. 22, 2006

(65) Prior Publication Data

US 2008/0154938 A1 Jun. 26, 2008

(51) Int. Cl.
*G06F 7/00* (2006.01)
*G06F 17/30* (2006.01)
(52) U.S. Cl. ...................................................... 707/742
(58) Field of Classification Search .................. 707/742, 707/7, 103 Z
See application file for complete search history.

(56) References Cited

U.S. PATENT DOCUMENTS

| 4,606,002 | A | * | 8/1986 | Waisman et al. ..................... 1/1 |
| 5,421,007 | A | * | 5/1995 | Coleman et al. ................... 707/7 |
| 6,349,308 | B1 | * | 2/2002 | Whang et al. ............. 707/103 Z |
| 7,689,544 | B2 | * | 3/2010 | Koenig ........................... 353/25 |
| 2004/0205044 | A1 | * | 10/2004 | Su et al. ............................ 707/2 |

* cited by examiner

*Primary Examiner* — Greta Robinson
*Assistant Examiner* — Jeffrey Chang
(74) *Attorney, Agent, or Firm* — Patrick J. S. Inouye; Krista A. Wittman

(57) ABSTRACT

Methods and systems for the generation of computer readable indexes or other ordered lists are provided. A corpus of electronic documents or other electronic information is parsed into postings that include key and reference pairs. An inversion buffer in memory is explicitly or implicitly formatted to receive the postings in a predetermined order by key. Each key is assigned a space in the inversion buffer that is subsequently filled with references associated with the key during an inversion method. In an embodiment, an index file is generated directly from the inversion buffer, or in the case of large inversions, from a plurality of inversion buffer segments.

23 Claims, 14 Drawing Sheets

SYSTEM AND METHOD FOR GENERATION OF COMPUTER INDEX FILES

FIELD

This application relates in general to information processing in a computer system and, in particular, to systems and methods for the generation of index files for a corpus of electronic documents.

BACKGROUND

Electronic data is being created and recorded in staggering amounts as our world becomes increasingly computerized. Unfortunately, finding particular data within discrete data sets becomes increasingly difficult as the amount of data grows. Efficiently searching for relevant data, whether in databases or in distributed environments such as the World Wide Web (the "Web") typically includes accessing one or more electronic indexes of the data within the data set. In generalized computing environments, the index is created and maintained by various commercially available database products. In the context of the Web indexes are created and maintained by a variety of Search Engines accessible via the Internet. The challenge in most environments is keeping the indexes current—reflecting the data as the data is added, removed and updated in the environment.

Indexes are commonly used to provide access to that electronic information. Inverted indexes are a type of index used in databases and search engines for indexing many-to-many relationships. An inverted index typically consists of a plurality of records, with each record having a key and one or more associated references. Each reference indicates the presence of the key in the referenced material. For example, an index of Web pages may contain many records with a word identifier as the key and a reference to the uniform Resource Locator ("URL") of the Web document that contains the word.

The process of generating an inverted index is referred to as "inverting the index." The inversion process is resource intensive and can often require large amounts of memory, disk space or time. Typical inversion methods partition the data into postings written to a posting file, divide the postings into intermediate files of a manageable size, and then progressively reading, sorting, dividing, recombining, and writing new intermediate files until all the postings are sorted. Once the latest version of the intermediate files represents all the postings properly sorted, the intermediate files are merged into an inverted index.

By way of example, an inversion method is illustrated in FIG. 15. The inversion occurs in multiple passes, with an earlier pass 1502 and a later pass 1504 illustrated. Two intermediate files 1506 and 1508 are created by the earlier pass 1502 and two newly created intermediate files 1510 and 1512 are created by the later pass 1504. While only two intermediate files are discussed so as to simplify the example, in most cases, the number of intermediate files required to perform the inversion method are determined by the number and size of the postings to invert, the amount of available memory, and the processing power of the computer system, among other possible considerations.

Each intermediate file 1506, 1508 in the earlier pass 1502, include four postings 1520-1526 and 1528-1534, respectively. The example discussed assumes that the inversion creates an index for the search of documents (or document identifiers) by terms (or term identifier) and that each intermediate file consumes all of the available memory.

Each intermediate file 1506, 1508 begins with unsorted postings 1520-1526 and 1528-1534, respectively. The first intermediate file 1506 is read into memory and sorted, resulting in unordered postings 1520-1526 being reordered by termID as posting 1526 (termID2), posting 1522 (termID3), posting 1520 (termID4) and posting 1524 (termID4). The first intermediate file 1506 is then written to storage memory. Similarly, the second intermediate file 1508 is then read into memory and sorted, resulting in unordered postings 1528-1534 being reordered by termID as posting 1528 (termID1), posting 1530 (termID2), posting 1534 (termID2) and posting 1532 (termID3).

In the example, the postings in intermediate files 1506 and 1508 remain unordered with respect to each other. To continue the sort of the entire set of postings 1520-1534, the intermediate files 1506 and 1508 must be merged 1540 and sorted again. This step occurs in the later pass 1504. The merge operation is much like shuffling a deck of cards. Some of the records 1552 from the intermediate file 1506 are combined with some of the records 1554 from intermediate file 1508 to form a new intermediate file 1510. Usually, this step involves reading the postings 1552 from storage, reading the postings 1554 from storage, and then writing the new intermediate file 1510 to storage. New intermediate file 1512 is similarly created from the combination of the remaining postings 1556 from intermediate file 1506 and the remaining postings 1558 from the intermediate file 1508.

Once the new intermediate files 1510 and 1512 are defined, the later pass 1504 sorts the individual intermediate files 1510 and 1512 as performed in the first pass 1502. If the entire set of postings 1520-1534 remains unordered, the intermediate files 1510 and 1512 are combined in another pass (not shown) and the process moves from earlier pass 1502 to later pass 1504 until the entire set of postings 1520-1534 is ordered. An index 1570 is then created by merging the intermediate files from the final pass.

Conventional creation and sorting of multiple layers of intermediate files is especially expensive in terms of time. Reading intermediate files from a disk drive, for example, is believed to be much slower than moving postings in memory, and writing intermediate files is believed to be even slower. The repeated use of intermediate files to sort large numbers of postings slows the creation of indexes, potentially making them less inclusive and current. There is an unmet need for improved systems and methods for generating inverted indexes and sorting large amounts of ordered pairs of data, particularly by eliminating or reducing reliance on time sinks, such as intermediate files.

SUMMARY

Methods and systems for generating ordered data sets of tuples are disclosed. A tuple states a relation between two or more data elements. One example of a tuple states as relationship between a key and a reference. The ordered data set of tuples might be ordered by the key. The reference, which may include multiple distinct pieces of data, may be retrieved by use of the key to retrieve the tuple from the ordered data set. The ordering of the data set of tuples is efficiently accomplished by allocating an inversion buffer in the memory of a computer. The inversion buffer is further defined to include a space for each key that is to be included in the ordered data set. In an embodiment, the spaces for these keys are arranged in the inversion buffer in a pre-defined order. A space for the insertion of a reference associated with the key is reserved in the key space for each reference that is associated with the key. The ordered data set is generated by iterating a data set of tuples and inserting the reference, or a reference identification, into the space reserved for that reference in the key space of the key that the reference is associated with by way of the tuple. The allocation and filling of the inversion buffer orders the tuples into all or part of an ordered data set, which can then be used immediately or saved for later use.

In an embodiment of the invention, an inverted index is generated from a plurality of postings. The postings are derived from a corpus of electronic information. Each posting includes a key value, for example, a term or a term identifier, and one or more reference values, for example, one or more references to any granularity of an electronic document, such as a file, a page, a paragraph, a sentence or a byte position in or at which the term appears. As the postings are derived, the quantity of reference values for the term is tracked. An inversion buffer is then allocated in memory. A space for each term to be indexed is reserved in the inversion buffer. Each of these term spaces are further allocated by reserving a space for each of the reference values that reference that term. An embodiment tracks the quantity of reference values that reference the term and allocates term spaces accordingly. Another alternative allocates uniform term spaces that are sized to accommodate the largest number of documents that reference any of the terms. The allocation and filling of the inversion buffer orders the postings into all or part of an index.

Another embodiment of the invention accommodates large amounts of data by dividing a virtual inversion buffer into a plurality of inversion buffer segments, which are individually processed and then combined into an index. The processing of these inversion buffer segments may be performed by a plurality of computers in a distributed system and then combined into a index.

Further embodiments of the invention permits the specification of subsets of index terms to be included in the inversion buffer or inversion buffer segments, pre-definition of sort orders, indexing of only unique terms, indexing of a single reference to a source document, or indexing of one or many relationships of the document to the term, such as the position of the term in the text, the formatting or semantic context of the term in the text, or the section in the document in which the term appears.

Still other embodiments will become readily apparent to those skilled in the art, including known substitutions, alternative code structures or hardware encompassing the claimed methods and systems any other modification to the details of the embodiments that do not depart from the spirit and the scope of the claims. Accordingly, the drawings and full content of this specification are to be regarded as illustrative in nature and not as restrictively representing the only embodiments that the claims are intended to encompass.

DETAILED DESCRIPTION

Exemplary Computer System and Network

Figure 1:
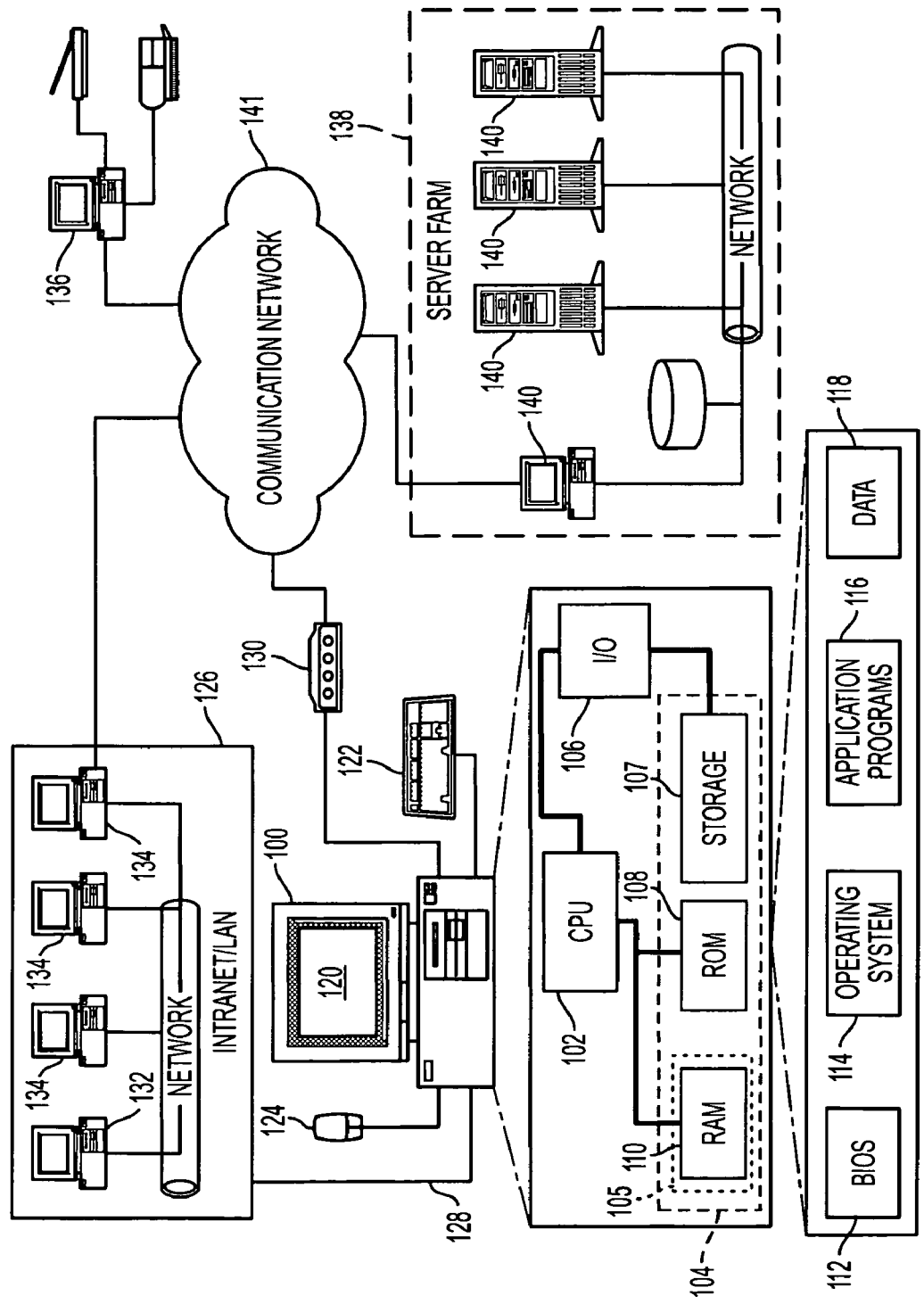
FIG. 1 is a block diagram of an exemplary computer system and network.

The block diagram shown in FIG. 1 illustrates an exemplary computer system. A computer 100 includes a central processing unit (CPU) 102, a system memory 104, and input/output (I/O) ports 106.

The system memory 104 includes working memory 105 and storage memory 107. The working memory 105 is generally addressable by the central processing unit (CPU) 102 and includes random access memory (RAM) 110. The CPU 102 can read from and write to RAM 110 at or near bus speeds. The CPU 102 can also read from, but not write to, read-only memory ROM (108), which is generally used to provide the CPU with very fast access to non-volatile information required at start-up or during operation of the computer 100.

Storage memory 107 includes memory that is generally not directly addressable by the CPU, and is thus not available to be acted upon by processor instructors performed by the CPU 102 without an intervening transfer of the information stored in the storage memory 107 to the working memory 105. The storage memory 107 is operably connected to the working memory 105, generally via an input/output bus (I/O) 106, such that information stored in the storage memory 107 can be transferred to the working memory 105.

Storage memory 107, generally, but not necessarily, includes non-volatile memory that stores information for as long as the information is required by the application. Examples of non-volatile memory includes solid state memory implemented via integrated circuits (broadly referred to as "flash memory"—which itself encompasses an ever increasing variety of technologies) and mechanical memory using, for instance, optical and magnetic technologies. Current technology generally implements optical and magnetic storage through mechanical disk drives. In the case of magnetic disk drives, a magnetic surface (or disk) rotates under read/write heads that electrically polarize zones of the magnetic surface as those zones rotate under each read/write head to represent the stored information. Similarly, with optical disk storage, such as CD-ROM and DVD-ROM, an optical media (disk) rotates under a laser beam that either writes data to the disk by altering the optical properties in zones on the disk or reads that data by analyzing the optical properties of zones on the disk.

The technologies now currently used by solid state and mechanical storage memory are converging, with magnetic and optical storage physics finding their way into solid state memory applications. Solid state storage memory is generally much faster than mechanical memory in both reads and writes. With mechanical storage in particular, writing storage memory is believed to be much slower than reading storage memory. As described herein, the storage memory 107 will be assumed to be slower than the faster working memory 105, in part due to the transfer time of the information between the storage memory 107 and the working memory 105. In the case of transfer from mechanical storage memory, the time necessary for a write operation may be much slower than a read operation. However, it is expected that any storage technology available at the time of use may be used for either the working memory 105 or the storage memory 107, in support of the various embodiments.

The system memory 104 contains a basic input/output system (BIOS) 112 for administering the basic input and output between components of the computer, an operating system 114 for providing the basic software services provided by the computer and application programs 116 that provide the functionality for performing specific tasks with the computer. Data may be stored and manipulated in the system memory 104 by any of the BIOS 112, operating system 114 and application programs 116.

The computer 100 has a display 120 for output of information and input devices, such as a keyboard 122, or a pointer device, such as a mouse 124. Suitable computers include conventional mainframe computers, server computers, personal computers, notebook computers, handheld computers, personal digital assistants, personal information managers, and hybrid devices incorporating computer capabilities, such as cable boxes, newer cellular telephones, and pagers.

The computer may be connected to a local area network (LAN or intranet) 126 through a network connector 128 or through a modem 130. A LAN 126 includes a server computer 132 and a plurality of client computers 134, which are all functionally similar to computer 100. The computer 100 or the LAN 126 may be connected to other computers 136 or other networks 138 through a communication network 141 to form a wide area network (WAN). The Internet is an example of a large scale WAN that connects together many computers 100.

Server computers 140 (functionally similar to computer 100 but generally more powerful) store application programs 116 and data 118 that are communicated to other computers for instance, 100, 134 and 136 connected to a network. In some cases, server computers 140 are interconnected to form parallel processing networks. These networks are designed to process applications concurrently by dividing tasks along the various server computers and combining results. The dividing, processing and combining of results may be accomplish many times while an application runs.

Exemplary Search Environment

A typical search environment can consist of large numbers of electronic documents all or any part of which may be defined as a corpus. An electronic document, Web document or simply, "document," includes a grouping of electronic data. A document is a grouping of electronic data partitioned from the corpus at any level. For instance, a document may comprise a complete Web site, a page, a paragraph, a clause, a sentence, an abstract or any granularity or combination of electronic information drawn from the corpus.

Figure 2:
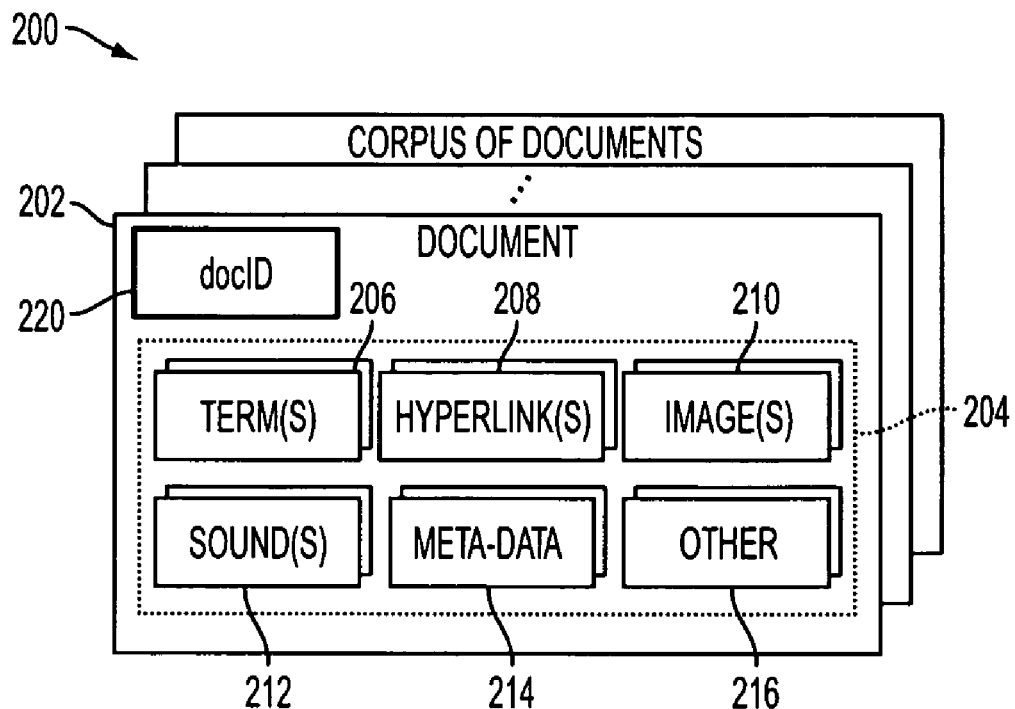
FIG. 2 is a block diagram of an exemplary search environment comprising a corpus of electronic documents.

An exemplary document 202 is shown in FIG. 2. Each document 202 includes a set of information items 204 that can be indexed together, in various combinations or into individual indexes. The information items 204 can include, by way of example, a term 206, a hyperlink 208, an image 210, a sound 212, meta data 214, or other information 216 that can be stored and communicated electronically. The document 202 generally is assigned a document identifier (docID) 220, which can be, for example, a filename, an alphanumeric reference label, or a path.

As used herein, discussion of a key, key identifier, key ID, key reference, term, term identifier, term ID, term reference or similar language should be considered to be interchangeable in the various embodiments unless otherwise specifically limited. The same breath should be given the discussion of references, reference identifiers, reference ID, documents, document identifiers, document ID or similar language, since use of literals or identifiers is considered a question of memory efficiency rather than a requirement of any method or system described.

One commonly indexed domain is the Web. The Web includes many billions of electronic documents or "Web documents", each of which represent a grouping of data identified by a Uniform Resource Locator ("URL"). The URL of a Web document often serves as its document identifier 220. A Web document often includes data and meta data. Meta data provides information that describes the data and may include formatting information, for example, HTML or information that identifies data, for example, XML. While many electronic documents are being standardized around the formats associated with the Web, many other documents are stored in proprietary formats. As described herein, each document 202 contains only terms, for example, words. However, any type of information that lends to being indexed is intended.

A subset of documents 202 is defined to be included in an index, such as all electronic documents accessible to a firm's internal network. A separate or combined index may define all electronic documents accessible via the Web. An index, therefore, will have a domain including the documents indexed and the type of information indexed. Typically, the index includes a plurality of key values that are used to "look up" references associated with that key value. In the context of terms within a document, each document in the corpus of documents 200 is parsed for terms. If a term is contained in the document, the index should reference that document when the term is queried.

Support Files and Memory Structures

An embodiment uses the support files and memory structures illustrated in FIGS. 2-8. Support files are generally held in storage memory 107 and accessed as needed, but may be held in working memory 110 when available. A support file is a grouping of data that can be electronically read or written. The support file may be a flat container of data or administered as a database table. Memory structures are generally held in working memory 110, but all or part may be cached to storage memory 107, when required. As described below, one embodiment utilizes arrays as the memory structures. An array is a list of data values, any element of which can be referenced by an expression containing the name followed by an indexing expression. A term or index value can often be used for the indexing expression to retrieve the associated data value contained in the array. Other memory structures may be substituted for the use of an array, for example, the use of pointers for direct access to values stored in addresses of working memory 110.

Figure 3:
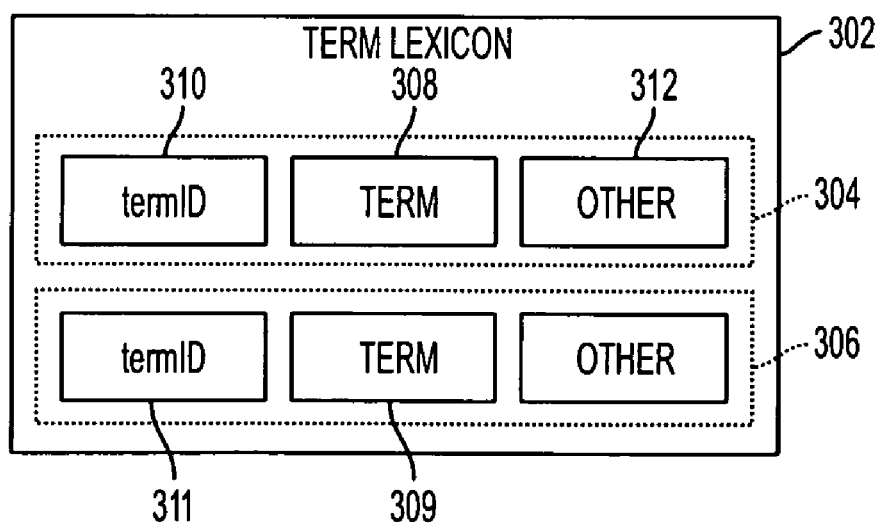
FIG. 3 is a block diagram of an exemplary term lexicon.
Figure 4:
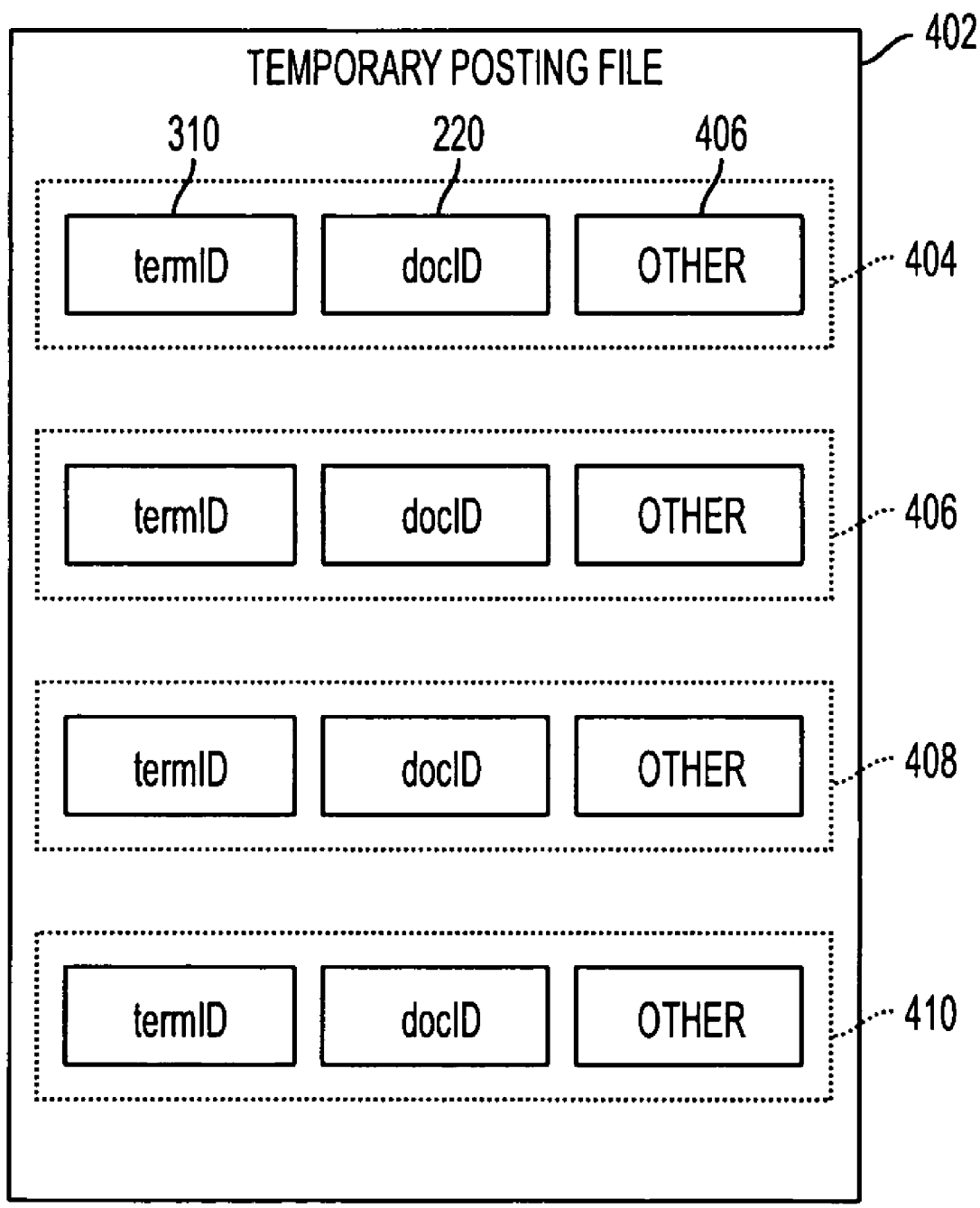
FIG. 4 is a block diagram of an exemplary temporary posting file.

Before the index can be created, the data must first be accumulated from documents 202 (FIG. 2), identified against a term lexicon file 302 (FIG. 3), formatted as a posting 404-410 (FIG. 4) and finally posted to a temporary posting file 402 (FIG. 4). The process for accumulating the data is discussed below in detail with reference to FIGS. 9-10. The support files will first be briefly introduced.

A term lexicon 302 (FIG. 3) is used to identify and track the terms to be included in the index. The term lexicon 302 includes a plurality of term records 304-306 that each include a term 308 or reference to the term, a term identifier (termID)

310 assigned to the term 308, and any other information or reference to other information 312 that is desired to be associated with the term 308. The index files may contain information other than terms. While the use of the term "lexicon" connotes a grouping of language elements, the term lexicon file 302 may track groupings of any type of information elements 204

The subset of electronic documents, alternatively referred to as the corpus of documents 200, is first parsed for data to be included in the index. As the terms 206 are retrieved from the document 202 and identified in the term lexicon 302, the term ID 310 is associated with the document ID 220 of the document 202 being processed. This association is posted as a posting 404 in a posting file 402. The posting 404 may contain other information or reference to other information 406. For example, the other information 406 may be indicators of where the term is located in the document 202, the section in which the term occurs in the document, formatting features of the term in the document and any other information that may assist in the indexing of the document. The posting file 402 includes a plurality of records 406-410, which are later used as the source material for the construction of the index, as discussed below with reference to FIGS. 11-14.

Figure 5:
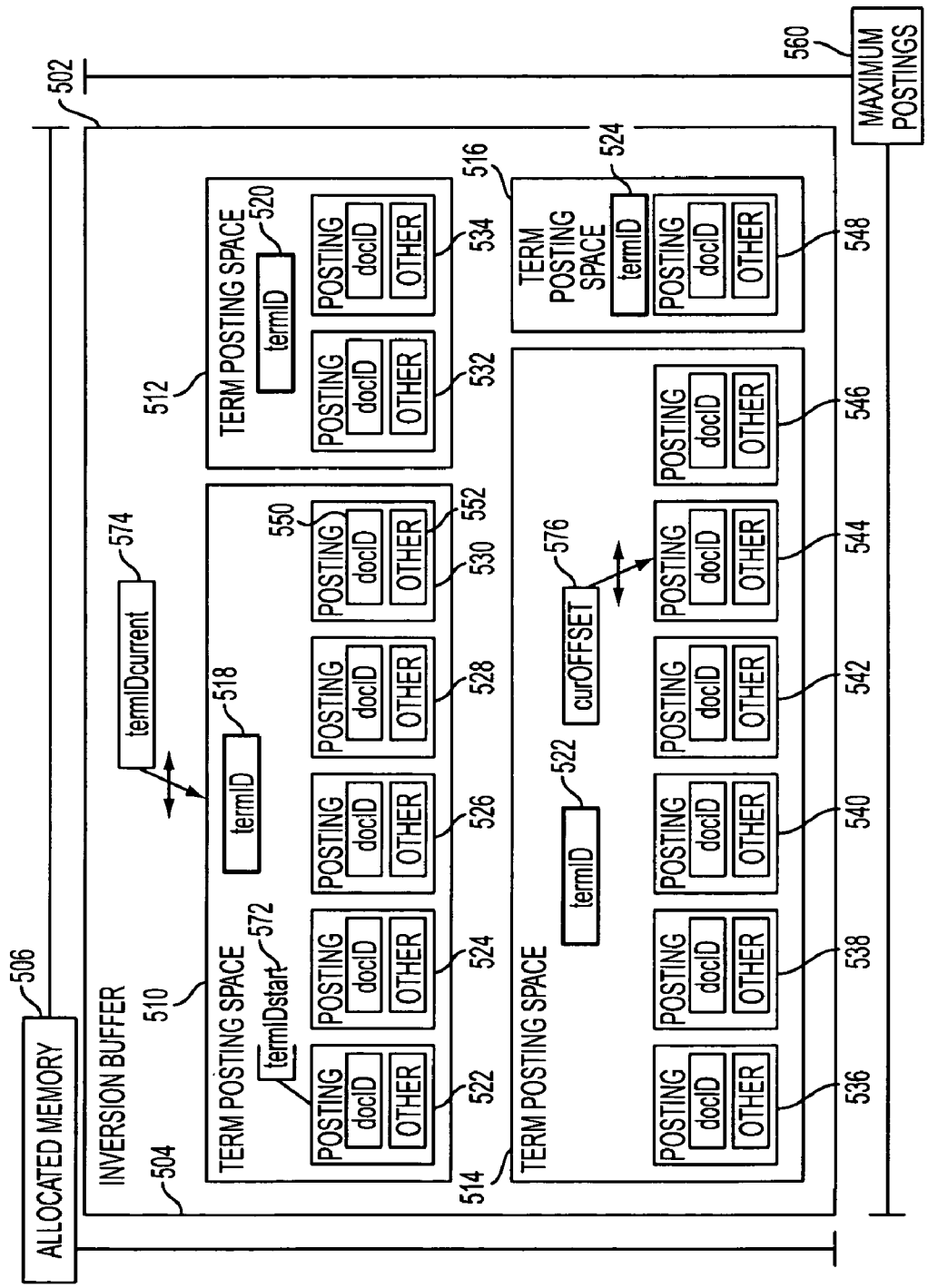
FIG. 5 is a block diagram of an exemplary inversion buffer.

An inversion buffer 502 is illustrated in FIG. 5. The inversion buffer 502 resides in memory 104. The inversion buffer 502 may include a number of different segments. The active inversion buffer segment 504 is assigned to allocated memory 506 within the working memory 110 (FIG. 1). Other inversion buffer segments 804-812 (FIG. 8) may be cached to storage memory 107 (FIG. 1) when not actively being worked upon. Rather than considering the inversion buffer to have many segments, a single instance of the inversion buffer 502 residing in allocated memory can be cleared and reused repeatedly for large data sets. The size of the allocated memory 506 is determined, given due deference to the availability of working memory 110 and the corresponding size of the supporting memory structures for the buffer offsets array (FIG. 6) and the documents frequency array (FIG. 7). repeatedly for large data sets. The size of the allocated memory 506 is determined, given due deference to the availability of working memory 110 and the corresponding size of the supporting memory structures for the buffer offsets array (FIG. 6) and the documents frequency array (FIG. 7).

The inversion buffer 502 includes a plurality of term posting spaces 510-516. Each term posting space 510-516 is associated with a term ID 518-524, respectively. Each term posting space 510-516 also reserves one or more spaces for postings 522-548. As illustrated for posting 530, each posting 522-548 includes a document ID field 550 and any other information field or fields 552 that may be desired to be associated with the posting 522-548.

The allocation of a number of term posting spaces 510-516 and the number of postings 522-548 that are allocated within each term posting space 510-516 is described in detail below with reference to FIGS. 7 and 12-14. By way of preview, however, in an embodiment that processes terms within a corpus of documents, each term posting space 510-516 reserves a posting space 522-548 for each document 202 that references the term 308 (FIG. 3) associated with that posting space 510-516. The fields 550-552 of postings 522-548 are filled during the inversion, described below.

FIG. 5 illustrates an exemplary inversion buffer 502 configured for the inversion of fourteen postings 522-548 associated with four terms IDs 518-524. The postings are included in the plurality of posting 404-410 illustrated in FIG. 4. Each of these four term IDs 518-524 is represented by a term posting space 510-516. Each term posting space 510-516 reserves a posting area 522-548 for receiving fields 550-552 from postings that are associated with the term ID 518-524 that is associated with the term posting space 510-516. For example, term posting space 510 is associated with term ID 518. The term posting space 510 reserves five posting spaces 522-530, one for each posting that is associated with the term ID 518. During the inversion process, described in detail below, as each posting associated with the term ID 518, for example, posting 404; (FIG. 4) is processed, the document ID 220 is inserted into or otherwise associated with the document ID field 550 of one of the posting areas 522-530. The subject term posting space 510 is associated with the term ID 518 that corresponds to the term ID 310 of the posting 404.

The inversion buffer 502 illustrated in FIG. 5 also illustrates that the number of posting areas 522-548 that are allocated within each term posting space 510-516 is variable and intended to be sufficient to accept the number of individual postings 404-410 that have a term ID 310 corresponding to the term ID 518 associated with the term posting space 510. Thus, the term posting space 512 has two postings 532-534 that are associated with term ID 520, the term posting space 514 has six postings 536-546 that are associated with term ID 522, and term posting space 516 has a single posting 548 that is associated with term ID 524.

Other embodiments of the inversion buffer could simply allocate the maximum number of postings associated with the largest of the term posting spaces, for example, term posting space 514, as shown, to all the term posting spaces 510-516, or even determine the minimum number of postings spaces required to process a term and assign some number of posting spaces above that minimum number of posting spaces to the term posting space 510-516

The determination of the maximum number of postings 560 is dependent upon the size of the allocated memory 506 available to the inversion buffer 502. The maximum number of postings 560 represents the upper boundary of the postings processed in the inversion buffer 502, and should not be read to require that any specific number of postings be processed at any one time. The allocated memory 506 available to the inversion buffer 502 permits the complete presence of four posting spaces 510-516, which contain a total of fourteen postings spaces 522-548. While the processing of postings associated with a particular term posting space across several inversion buffer segments 504 can be split, processing all postings associated with a particular term posting space within a particular inversion buffer segment 504 is preferable. The maximum number of postings 560, therefore, may not necessarily reflect the maximum number of postings that can physically occur within the allocated memory 506, but rather reflect the maximum number of postings contained within that number of term posting spaces 510-516 that can be fully processed within the inversion buffer segment 504. In another embodiment, a term posting space can be split between inversion buffer segments. The determination of the maximum number of postings 560 that will be processed in any given inversion buffer segment 504 fit is further discussed below with reference to FIG. 11.

The administration and navigation of the inversion buffer 502 is implemented in an embodiment using several variables and pointers. To normalize the starting value of the term IDs being processed in the current inversion buffer segment 504, the starting value is held in term ID start pointer 572. The current term posting space 510-516 is tracked using a term ID current pointer 574. The current posting 522-548 relative to the current term posting space 510-516 is tracked using a current offset pointer 576. A pointer is a variable that contains the index location of some data within the array or may, alternatively, contain the memory location (address) of some data, rather than the data itself. The computation of the term ID current pointer 574 and the current offset pointer 576 are implemented using the document frequency array 602, an example of which is illustrated in FIG. 6, and a buffer offsets array 702, an example of which is illustrated in FIG. 7.

Figure 6:
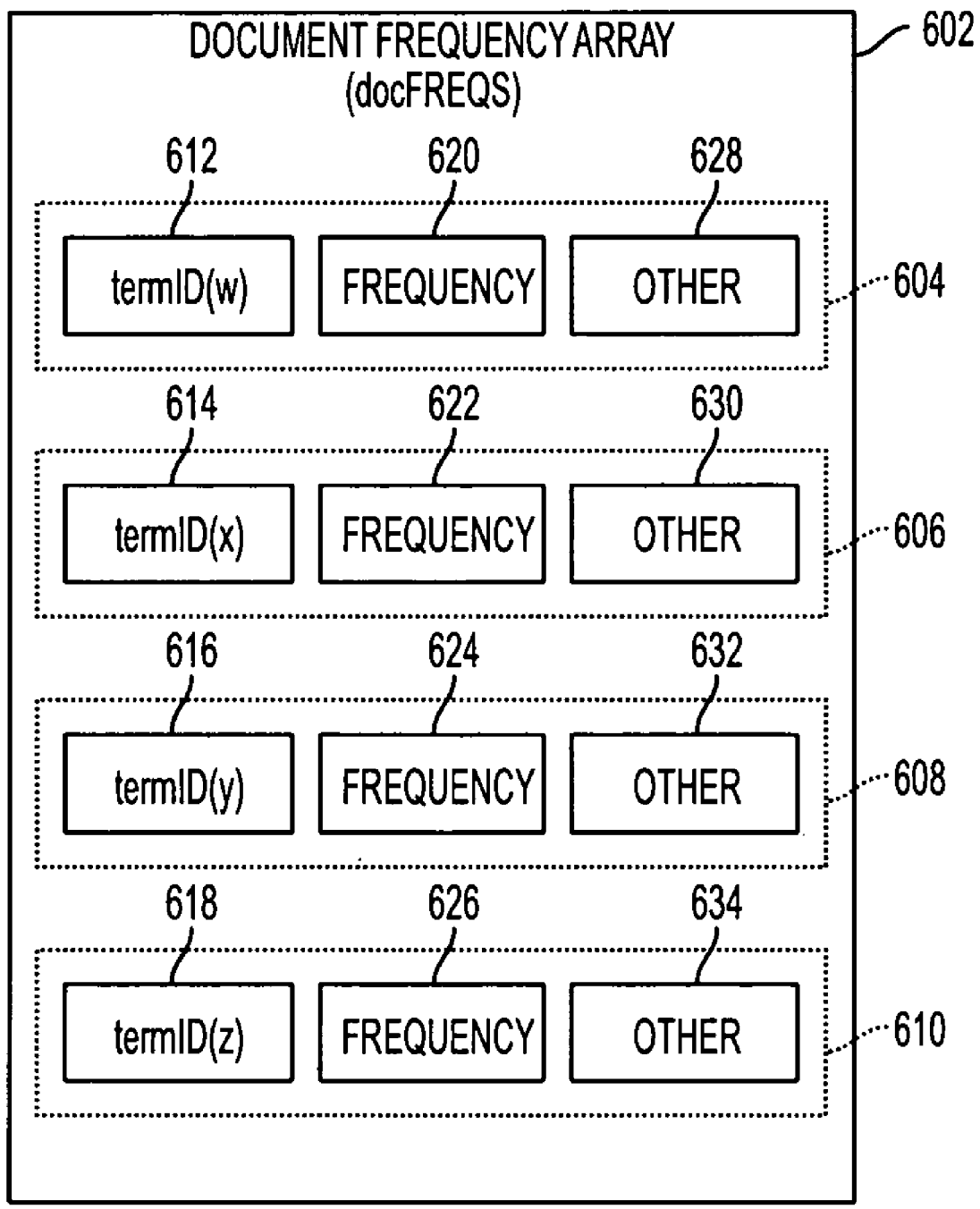
FIG. 6 is a block diagram of an exemplary document frequency array.
Figure 7:
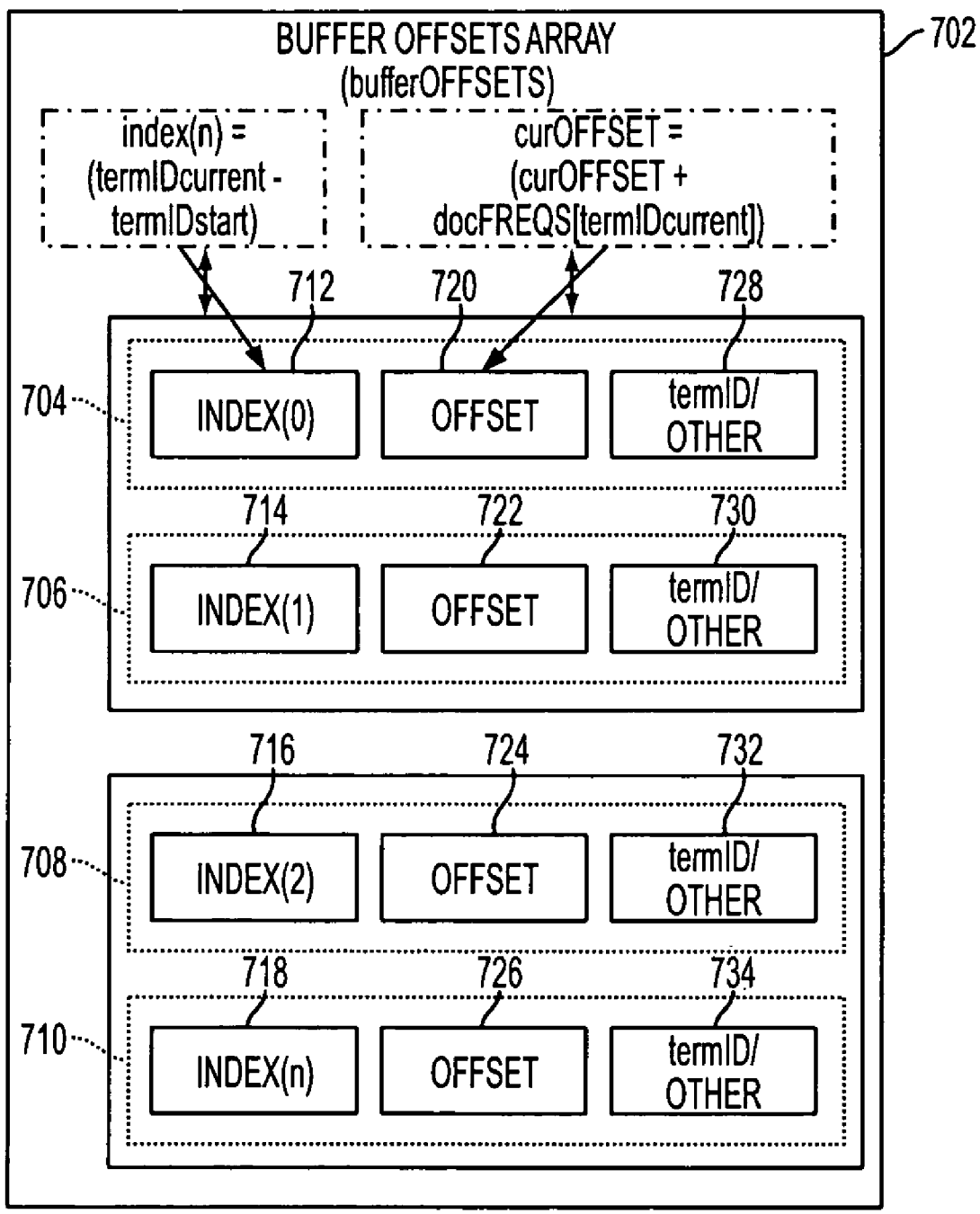
FIG. 7 is a block diagram of an exemplary buffer offset array.

Referring to FIG. 6, an example of a document frequency array (docFreqs) 602 is illustrated. The document frequency array 602 includes a plurality of document frequency records 604-610. Each of these document frequency records 604-610 includes a field for holding a term ID 612-618 and a frequency field 620-626 that keeps a count of the number of references to the associated term ID 612-618. Other information 628-634 may be associated with any or all of the document frequency records 604-610. The administration and usage of the document frequency array 602 is discussed below with reference to FIG. 10. In part, the value of the frequency field 620-626 is used to dimension the number of posting spaces 522-548 within a term posting space 510-516 having a term ID 518-524 that corresponds to the term ID held in the term ID field 612-618. As each document frequency record 604-610 is accessed, the term ID current pointer 574 is set to the value of the term ID held in the term ID fields 612-618.

An example of a buffer offsets array 702 is shown in FIG. 7. The buffer offsets array 702 includes a plurality of offset records 704-710, each of which is identified by an index position 712-718 and includes an offset field 720-726. Other information 728-734 (e.g., the term ID associated with the entry 704-710 at that instant) may be associated with their respective offset records 704-710. The administration and usage of the buffer offsets array 702 are discussed below with reference to FIG. 13.

Index File

Figure 8:
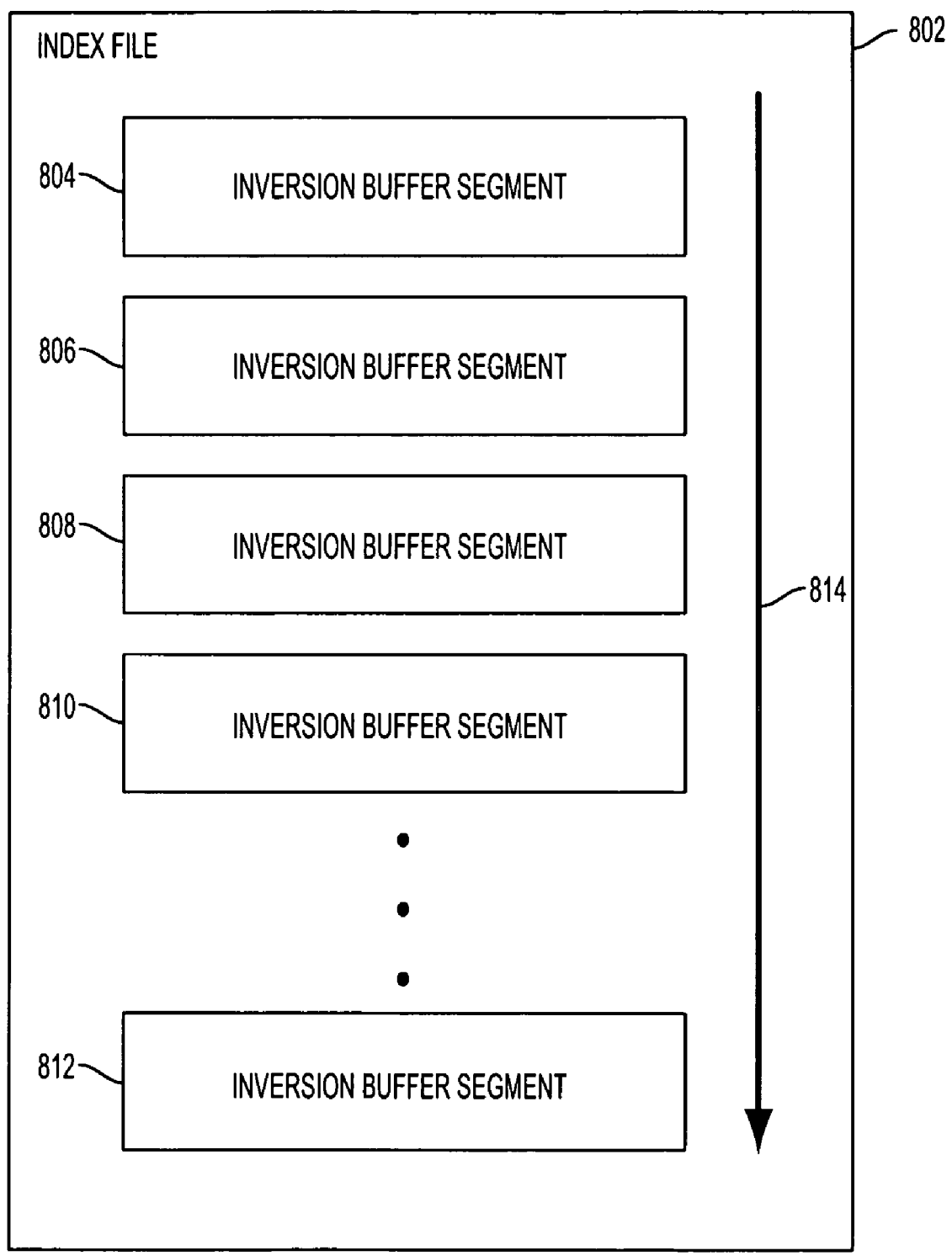
FIG. 8 is a block diagram of an exemplary index file.

An example of an index file 802 is shown in FIG. 8. An index file 802 is generally a listing of keywords and associated data that point to a location of more comprehensive information, such as files and records on the disk or record keys in a database. In the context of a Web search, an index file 802 will typically include a plurality of records, each of which include a term as a key and a URL, other identifier of a document or subdocument, as the associated reference. The composition of index files and their use is well known.

The index file 802 may be created directly from the inversion buffer 502 (FIG. 5). As is discussed below in detail, the filling of the posting areas 522-548 in the inversion buffer 502 results in sorted document IDs 550 that become associated with term IDs 518-524. If there is sufficient space in the allocated memory 506 to include all of the postings 404-410 (FIG. 4) in the posting file 402, the inversion buffer 502 can be directly written as the index file 802 (FIG. 8). When the number of postings 404-410 in the posting file 402 exceeds the maximum postings 560, a plurality of inversion buffer segments 804-812 are iterated.

Data Acquisition/Posting Accumulation

Figure 9:
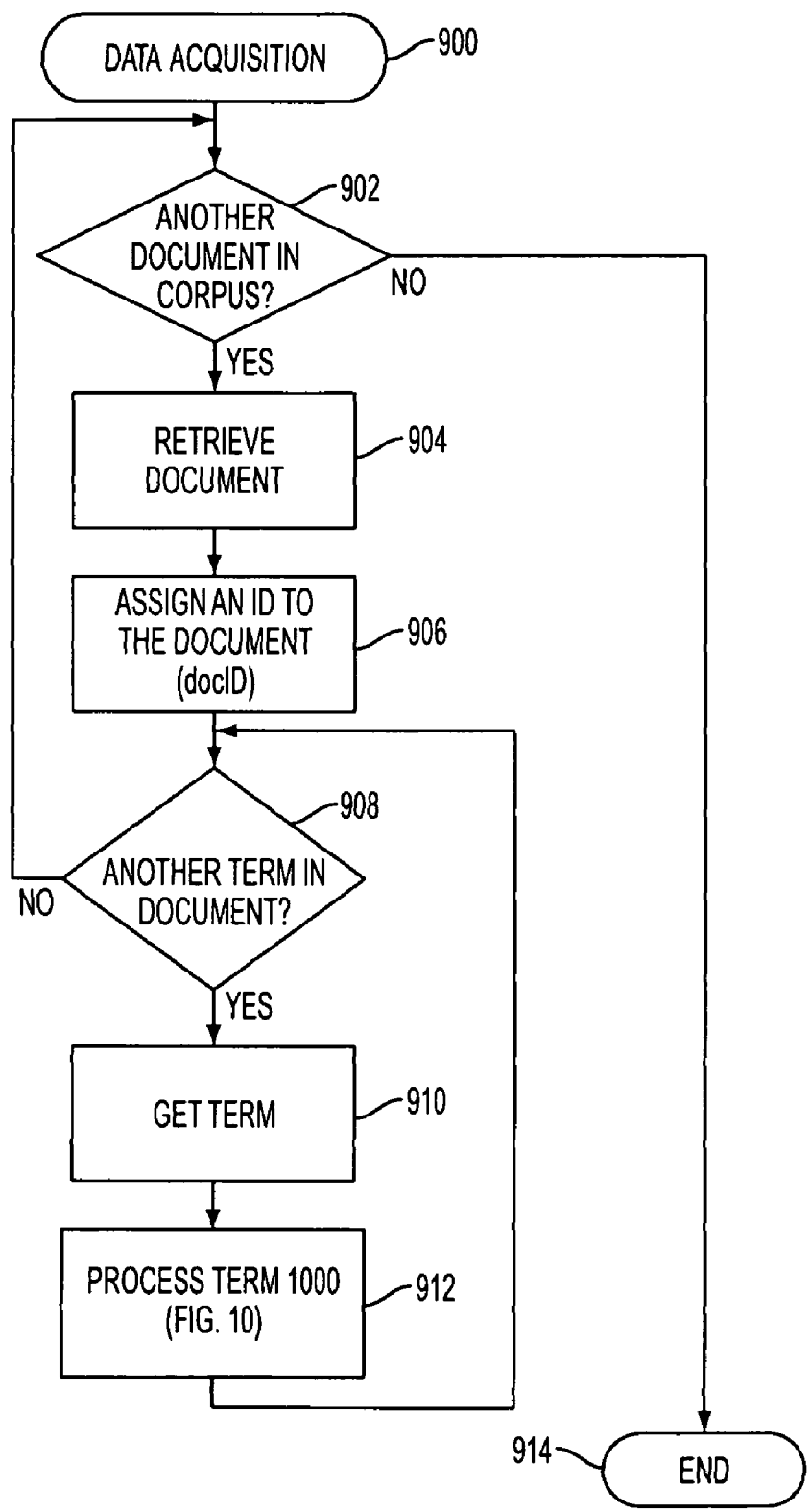
FIG. 9 is a functional flow diagram of an exemplary data acquisition method.

The process of accumulating the data for inclusion in the index file 802 is illustrated in FIG. 9. The data acquisition process 900 begins with a decision 902 that determines if another still unprocessed document 202 exists in the corpus of documents 200. If there is another document 202, the document 202 is retrieved in a block 904 and assigned a document identification (docID 220) in a block 906. The process then begins to parse the document 202 for terms beginning with a decision block 908 that checks whether another term 206 exists in the document 202. If there is another still unprocessed term 206 in the document 202, the term 206 is retrieved in block 910 and that term 206 is then processed in a block 912 (described below with reference to FIG. 10). Once the term 206 has been processed, the method 900 returns to the decision 908 to determine whether there is another term 206 in the document 202. If found, block 910 and decision block 912 are repeated. If all of the terms 206 in the document 202 have been processed, the method returns to the decision block 902 to determine whether there is another document 202 in the corpus of documents 200 to be processed. If found, the method moves to block 904 where the next document 202 is retrieved and the process continues with block 906, as described above. If all of the documents have been processed, the method moves from decision block 902 to the end block 914 of the data acquisition method 900.

Figure 10:
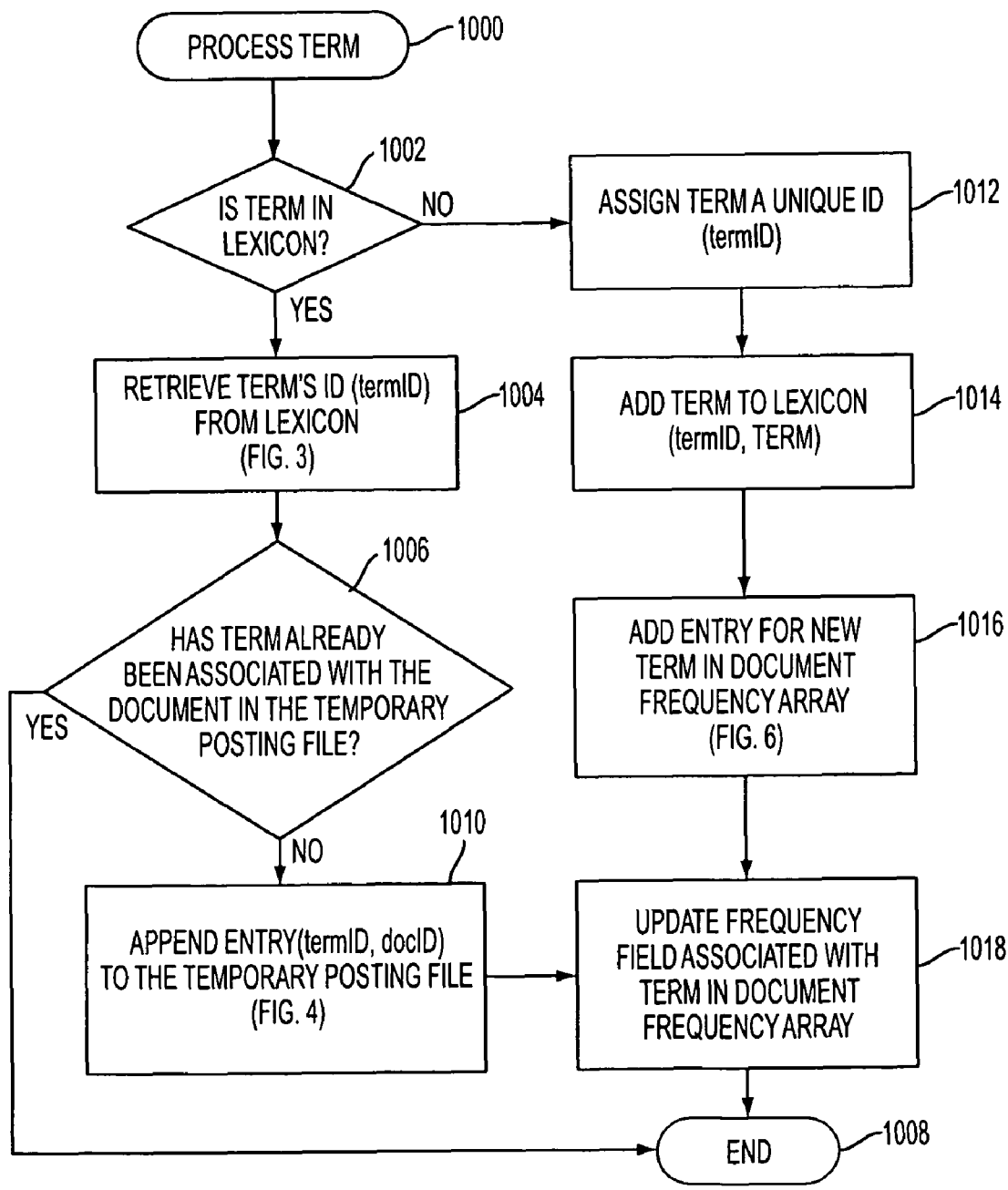
FIG. 10 is a functional flow diagram of an exemplary term processing method.

A term processing method 1000 is illustrated by the functional flow diagram shown in FIG. 10. The term processing method 1000 is passed the term 206 (retrieved in block 910) from the document 202 (retrieved in block 904). A decision block 1002 determines if the term 206 is already the subject of an entry in the term lexicon 302 (FIG. 3). If a term entry 308 is found that corresponds to the passed term 206 in the term lexicon 302, the corresponding term ID 310 is retrieved from the term lexicon 302 in a block 1004.

Decision block 1006 next determines if the term 206 has already been associated with the document 202 in the temporary posting file 402 (FIG. 4) by searching for the presence of an existing posting, for example, postings 404-408 that associates the term ID 310 (corresponding to the term 206) with the document ID 220 (corresponding to the document 202). If such a posting is found (for example, posting 404) in the temporary posting file 402, the term processing method 1000 ends at a block 1008 and then returns to block 912 of FIG. 9.

If a existing posting 404 is not found in the temporary posting file 402 that already associates the term ID 310 with the document ID 220, a new posting (for example posting 410) is added to the temporary posting file 402 in a block 1010. The document frequency array 602 (FIG. 6) is updated in a block 1018 by locating the document frequency entry (for example, frequency entry 604) associated with the term ID 310 (for example, term ID field 612) and altering (for example, incrementing) the frequency field 620 to indicate occurrence of the term 206 in another unique document 202. The term processing method 1000 then ends at block 1008 and returns to block 912 of FIG. 9.

Returning to the decision block 1002 of FIG. 10, if the passed term 309 does not have a current entry (for example, entry 304) in the term lexicon 302 (FIG. 3), a term ID (for example, term ID 311) is assigned to the term 309 and a new entry (for example, entry 306) is added to the term lexicon 302 including the term ID 311 and the term 309 in a block 1014. In a block 1016, a new record (for example, document frequency entry 606) is added to the document frequency array 602 (FIG. 6) for the new term ID 311, which is assigned to term ID field 620. The method 1000 then continues with block 1018.

One actual embodiment is implemented using discrete memory structures including a term lexicon 302 (FIG. 3), a temporary posting file 402 (FIG. 4), a document frequency array 602 (FIG. 6) and a buffer offset array 702 (FIG. 7). While these memory structures provide an efficient implementation, the function of the various memory structures can in many cases be combined or otherwise shuffled to accomplish the same result. For example, the document frequency array 602 may be combined with the posting file 402 by adding a frequency field 620 to each entry 404-410. Similarly, the offset field 712 found in each entry 704-710 of the buffer offset offsets array 702 may be combined with the entries 604-606 found in the document frequency array 602, so that each offset field 712 remains associated with the proper term ID 610. The term frequency field 620 can be, and often is, made part of each record 304-306 of the term lexicon 302. In other embodiments, the presence of the term frequency field 620 in the term lexicon 302 is advantageous for relevance analysis. Many other combinations are possible and all are intended to be encompassed.

Inversion

Once the data for inclusion in the index has been obtained, for example, by creating or otherwise providing the temporary posting file 402, the index can be generated through an inversion method 1100 described below with reference to FIGS. 11-14.

Figure 11:
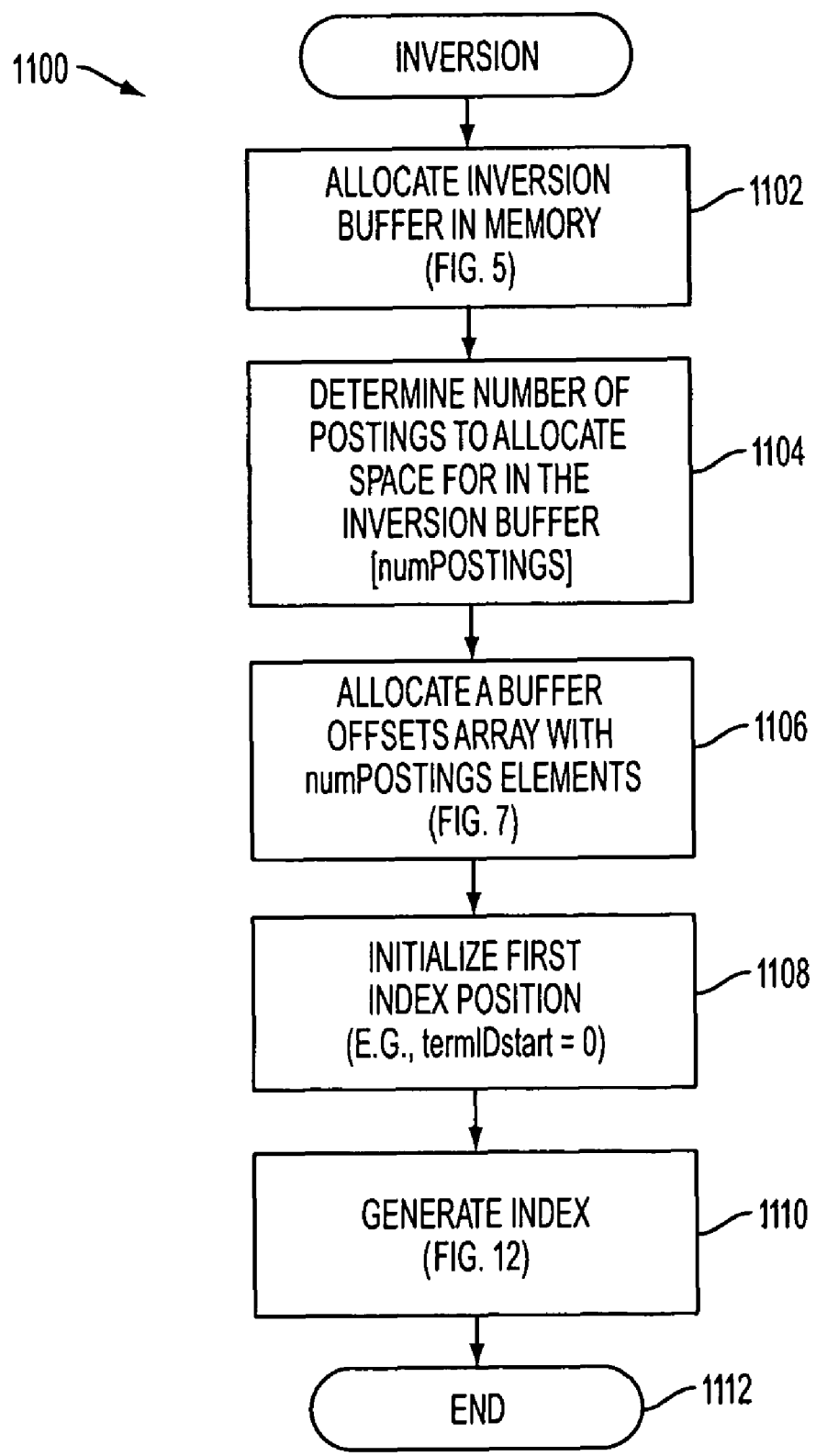
FIG. 11 is a functional flow diagram of an exemplary inversion method.

Referring to FIG. 11, the inversion method 1100 begins with a block 1102 that allocates an inversion buffer 502 in memory. An example of an inversion buffer 502 is discussed in detail above with reference to FIG. 5. To briefly review, the allocation of the inversion buffer 502 involves reserving one or more term posting spaces 510-516 in the allocated memory 506 provided by the operating system 114 (FIG. 1). Each term posting space 510-516 is associated with a term ID 518-524. Within each term posting space 510-516, a posting space 522-552 is allocated. Each posting space 522-548 reserves a document ID field 550.

In a block 1104, a determination is made of the number of postings 522-548 that will be allocated within each inversion buffer segment 504. This determination takes into account, among other considerations, the size of the allocated memory 506 available for processing the inversion buffer segment 504, the availability of memory 104 for the document frequency array 602 (FIG. 6) and the memory available for the buffer offsets array 702 (FIG. 7). Although allocating space in the working memory 110 for the document frequency array 602 and the buffer offsets array 702 is preferable, either or both of these supporting memory structures may be delegated to all or part of the storage memory 107. The number of term posting spaces 510-516 that can each be completely processed within a single inversion buffer segment 504 are also considered. While preference is given to processing all the postings, for example, postings 536-546 associated with a given term posting space, for example, term posting space 514, in a single inversion buffer segment 504, a given term posting space 514 may be split across several inversion buffer segment 504 when required.

In a block 1106, a buffer offsets array 702 (FIG. 7) is allocated with a size capable of storing records 704-710 associated with the number of postings used to allocate the inversion buffer segment 504. The allocated size in memory 104 of the buffer offsets array 702 will depend, in part, upon the number of records to be stored in the buffer offsets array 702 at any given time and the size of each record 704-710. The size of each record 704-710, in turn, depends upon the size of the term ID field 712-718, the offset field 712-713, and any other fields 728-734 associated with the record 704-710. The buffer offsets array 702 is preferably allocated in the working memory 110, but may be allocated in storage memory 107 if the speed of the inversion is not a major concern or if made preferable by other considerations. The buffer offsets array 702 is described in detail above with reference to FIG. 7.

A variable that holds the starting term ID (term ID start) for each inversion buffer segment 504 is initialized, for example, set to an initial value of zero in a block 1108. An index generating method 1200 is then called in a block 1110. When the index generating method 1200 returns to block 1110, the inversion method 1100 ends in a block 1112.

Figure 12:
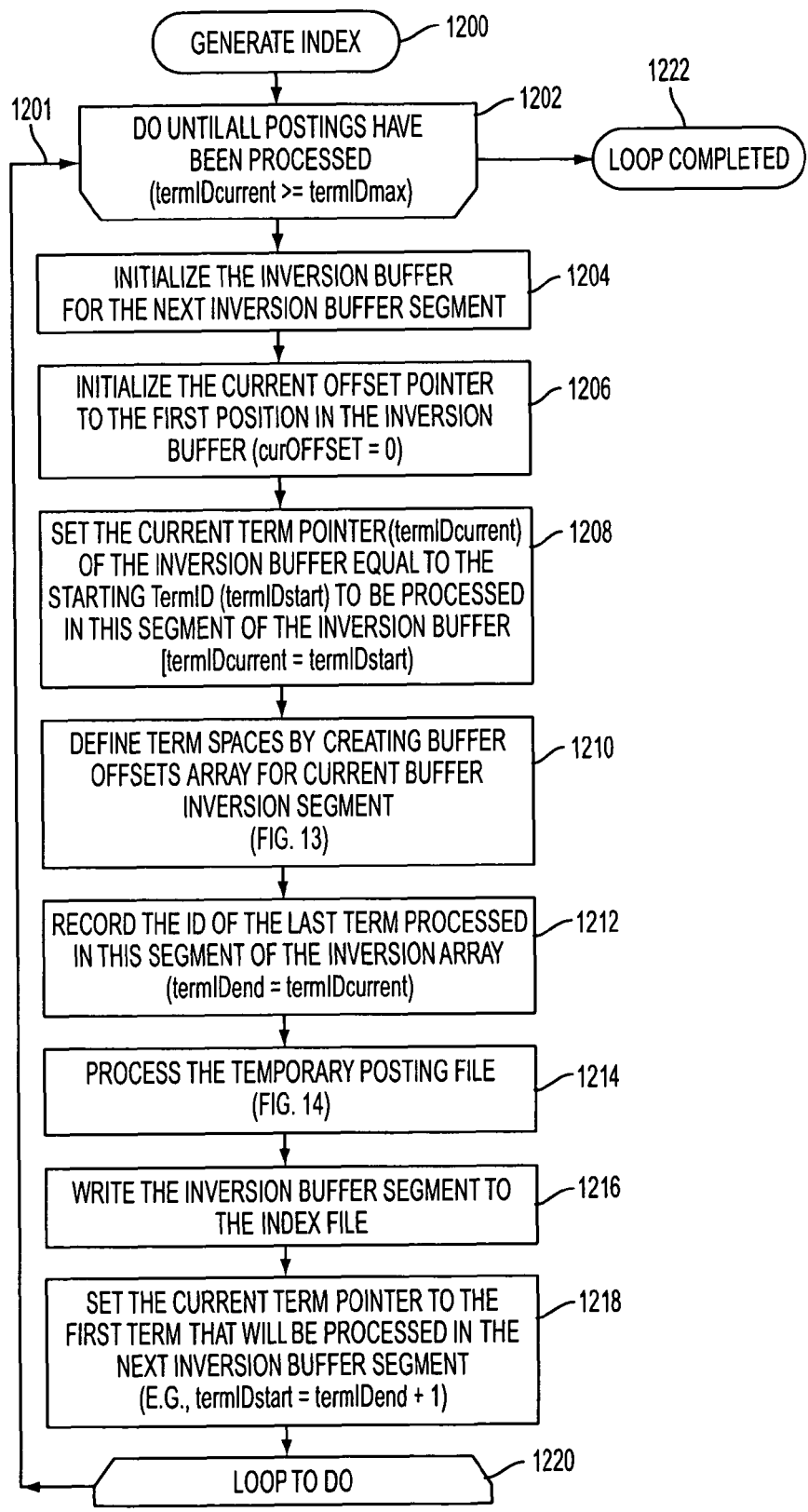
FIG. 12 is a functional flow diagram of an exemplary index generating method.

An embodiment of the index generating method 1200 is illustrated in FIG. 12. The index generating method 1200 comprises a loop that processes one or more inversion buffer segments 504 until all postings 404-410 in the temporary posting file 402 (FIG. 4) are processed. The loop 1201 of index generating method 1200 begins with a start loop block 1202 and continues with intervening blocks 1204-1218 to an end loop block 1220. The end loop block 1220 returns control to the start loop block 1202. The start the block 1202 directs control to the next block 1204, et. seq., until all postings 404-410 in the temporary posting file 402 (FIG. 4) have been processed. Once all the postings 404-410 have been processed, the loop is completed and the generate index method 1200 ends at a block 1222. Program control then returns to block 1110 of FIG. 11.

As discussed below, the number of postings 404-410 may exceed the number of postings 560 (FIG. 5) that are allocated in a given inversion buffer segment 504. When this condition happens, the postings 404-410 are processed in a series of inversion buffer segments 504. The inversion buffer segment 504 is initialized for each iteration of the loop in a block 1204. This initialization may include clearing the inversion buffer 502 of data from the previous pass, resetting variables and pointers to an initial values, and so forth. For example, the current offset pointer is initialized to the first position of the memory structure implementing the inversion buffer segment 504 in a block 1206. In one embodiment, the inversion buffer is implemented using an array with an initial position indicated by the index position zero. The current offset pointer 576 is, therefore, set to an initial value of zero.

The current term pointer 574 is set equal to the starting term ID 572 in a block 1208. The starting term ID 572 is a variable {term ID start} that contains the value of the term ID that is the first to be processed in the inversion buffer segment 504 during this iteration of the loop 1202-1220. In this manner, the current term pointer 574 is normalized for each iteration of the inversion buffer segment 504 by setting the pointer to begin with the starting term ID 572 associated with that iteration.

Each iteration of the inversion buffer segments 504 allocates term posting spaces 510-516 in a block 1210. Block 1210 calls a create buffer offsets array method 1300 that is described below with reference to FIG. 13. The buffer offsets array 702 (FIG. 7), once created, implicitly formats the inversion buffer segment 504 into term posting spaces 510-516 by defining the offsets 712-713 within term posting spaces 510-516 that account for the posting spaces 522-548. An offset value accounts for the positional difference between the physical storage of values in a memory structure. For example, in an array memory structure, an offset of two indicates that the next index position for use after index position three is index position five. An offset value can also indicate the memory size in bytes of individual postings when directly accessing memory 104. The positioning of the postings in the memory 104, therefore, calculates physical memory locations by the addition of the offset value to a previously stored memory location. Whether accounting for index positions or memory locations, the offset value contained in the offset fields 712-713 of the buffer offsets array are used for positioning the entry of the posting information as the inversion buffer segment 504 is filled. The term ID value held in the term ID field 710 of the buffer offsets array 702 implicitly associates the term ID 518-524 with their respective term posting spaces 510-516.

The identification of the last term, for example, term ID 524 to be processed in this iteration of the inversion buffer segment 504 is stored in a term ID end variable in a block 1212. In one embodiment, the term ID end variable is set to the most recent value of the term ID current variable, which will reflect the ending value of the term ID following the creation of the buffer offsets array in block 1210.

A temporary posting file processing method 1400 is called in a block 1214. The temporary posting file processing method 1400 is discussed below in detail with reference to FIG. 14. The temporary posting file processing method 1400 fills the inversion buffer segment 504 by inserting each document IDs 550 of the term been currently processed in the posting space associated with the term ID. Following block 1214, the inversion buffer segment 504 includes an ordered list of the information contained in the postings associated with the term IDs then associated with the inversion buffer segment 504 and in process, that is, the inversion buffer segment 504 now includes all or a portion of an inverted index 802.

The inversion buffer segment 504 is written to the index 802 in a block 1216. Referring to FIG. 8, the index 802 includes a plurality of inversion buffer segments 804-812. In one embodiment, each inversion buffer segment 804-812 is written sequentially to the index file 802 as the generate index processing loop 1200 is executed and block 1216 is reached. Assuming that the term IDs 518-524 are divided along the various inversion buffer segments 804-812 in the order they are desired to be listed in the index 802, the inversion buffer segments 804-812 can be written sequentially 814 to the index file 802. An inverted index 802 results from this method 1200. In an embodiment, the inversion buffer segments 804-812 are processed in the order that the contained terms are to be ordered in the index file 802 and the inversion buffer segments 804-812 can be individually processed, stored, and then later ordered and assembled into the index file 802.

In block 1218, the variable term ID start 572 is updated to reflect the starting point of the next iteration of the inversion buffer segment 504 by incrementing the term ID end variable to the next term ID 518 to be processed. For example, the term ID start value can be computed by adding one to the term ID end value, assuming that the term IDs are sequential (which they do not necessarily have to be). In this way, term ID end is used to normalize the term ID current pointer (block 1208) for each iteration of the inversion buffer segment 504. The use of the variables illustrated in blocks 1208, 1212 and 1218 are but one example showing the normalizing of the current offset pointer 574 for each iteration of the inversion buffer segment 504 and any alternative means may be used. Program control is then passed to the end loop block 1220, which returns control to the start loop block 1202.

Figure 13:
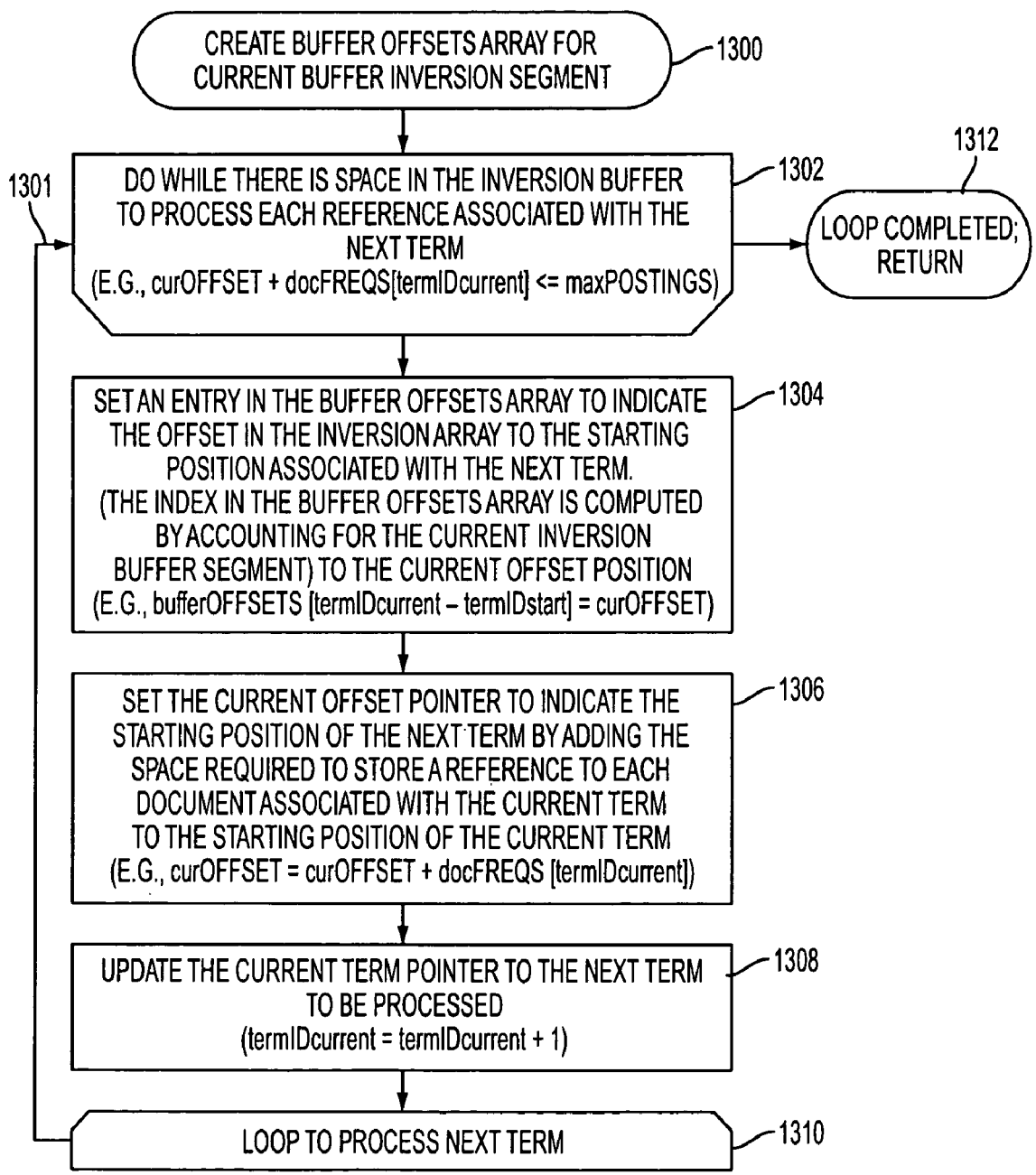
FIG. 13 is a functional flow diagram of an exemplary method for generating the buffer offset array shown in FIG. 7.

A method for creating the buffer offsets array 1300 is illustrated with reference to FIG. 13 and the block diagram of an example buffer offsets array 702 shown in FIG. 7. The method 1300 is implemented using a loop 1301 that begins with a start loop block 1302 that executes intervening blocks 1304-1308 before reaching an end loop block 1310. The end loop block 1310 returns control to the start loop block 1302 to complete the loop 1301.

Each iteration of the loop 1301 implicitly formats a term posting space (for example, term posting space 514) for the term ID currently being processed (termIDcurrent 574) by computing and assigning an offset value (for example, offset 712) in the buffer offsets array 702 of the entry (for example, entry 704) associated with the current term ID 574. The offset values 704-710 initially specify the starting location of each term posting space 510-516. These offset values 704-710 are updated to specify the location of the posting spaces (for example, posting spaces 526-546) within each term posting space (for example, term posting space 514) as is described below with reference to FIG. 14.

If start loop block 1302 determines that there is space available for the next term posting space, the start loop block 1302 will continue execution of the loop 1301 by directing control to block 1304. In one embodiment, the determination of whether the loop 1301 should continue is made by adding the current offset value 722-723 (FIG. 7) to the frequency value 620 associated with the current term ID 574 from the document frequency array 602 (FIG. 6). For example, curOffset+docFreqs[termIDcurrent]<=maxpostings. If the result of this calculation is less than or equal to the maximum number of records (maxPostings) 560, space is available in inversion buffer segment 504 for the next term posting space, for example, term posting space 514 and the loop will continue by moving to block 1304.

In a block 1304, a record 704-710 is selected from the buffer offsets array 702 by computing the index value 712-718 of a record 704-710 in the buffer offsets array 702. The offset field (for example, 712) of the entry (for example, 704) with the computed index value is then set to the value of the current offset pointer 722. The term ID field (for example, 710) of the record 704 is set to the current term ID 574.

In one embodiment, the records 704-710 associated with the term posting spaces 514-516 will be assigned to their respective memory structures in the same relative order. To account for a plurality of buffer inversion segments 804-812, the term indexed value 712-718 is determined by subtracting the value of the term ID start field 572 from the value of the term ID current field 574. The buffer offset array 702 can be implemented as a different type of memory structure, for example, as a table in a database, where the records 704-710 are referenced by the value of an associated term IDs 728-734.

The current offset pointer 712-713 is set in a block 1306. The offset pointer 712-713 is computed by adding the space required to store each of the postings (for example, 536-546) associated with the term posting space (for example, 514) associated with the current term ID value 574, which is the subject of the current iteration of the loop 1301. The space required to store each of the postings is retrieved from the document frequency array 602 (FIG. 6) using the current term ID 574 to select its associated record 604.

The current term ID field 574 is then updated in block 1308 to indicate the term ID 310-311 to be processed in the next iteration of the loop 1301. Assuming that the term IDs are sequential, the term ID current pointer is incremental by one. The term IDs need not be sequential and the assignment of the next term ID to be processed can be accomplished through other means. Program control then moves to end loop block 310, which passes control to the begin loop block 1302. When the beginning loop block 1302 decides to end the loop 1301, the loop is completed 1312 and process control returns to block 1210 of FIG. 12.

Figure 14:
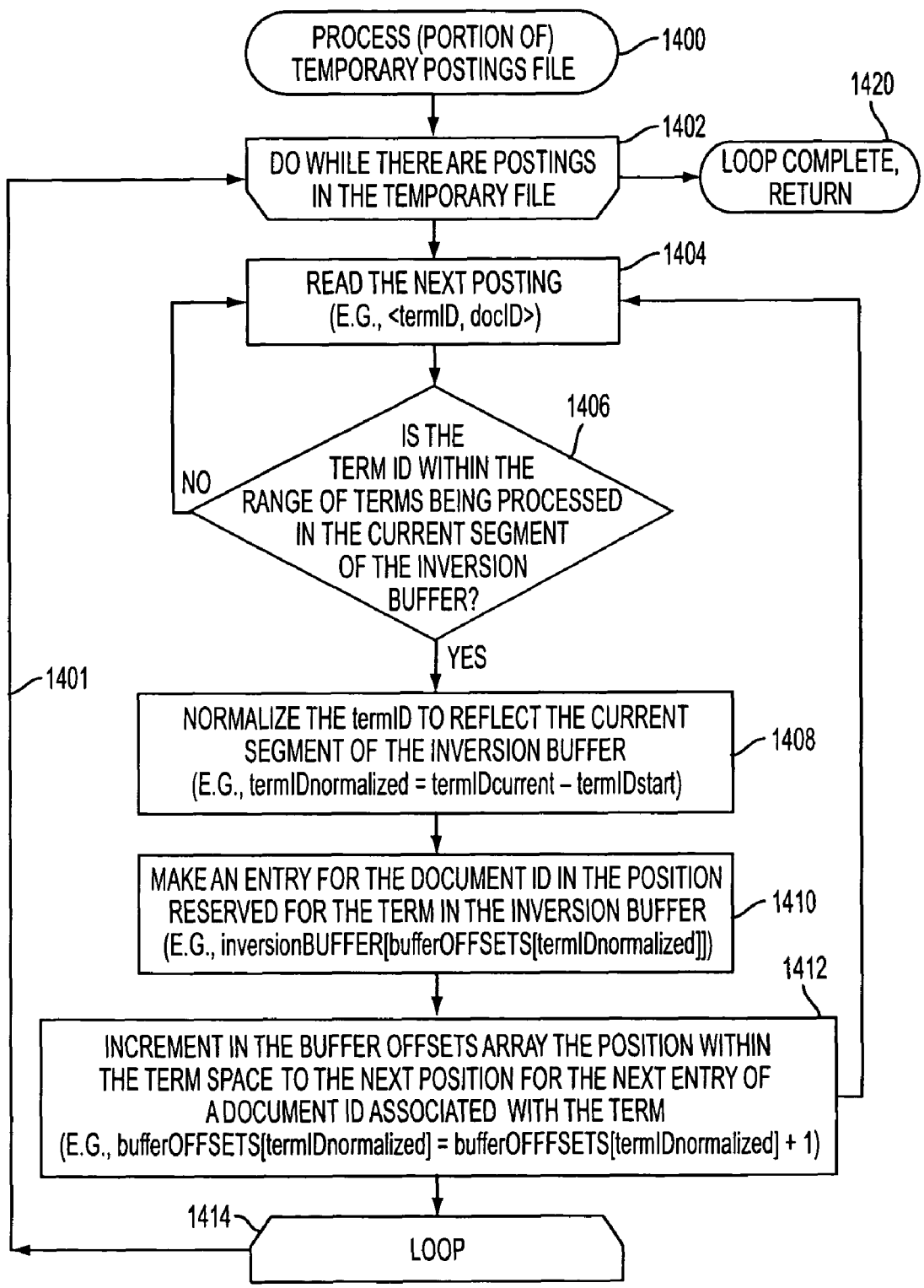
FIG. 14 is a functional flow diagram of an exemplary method for processing the temporary postings file.
Figure 15:
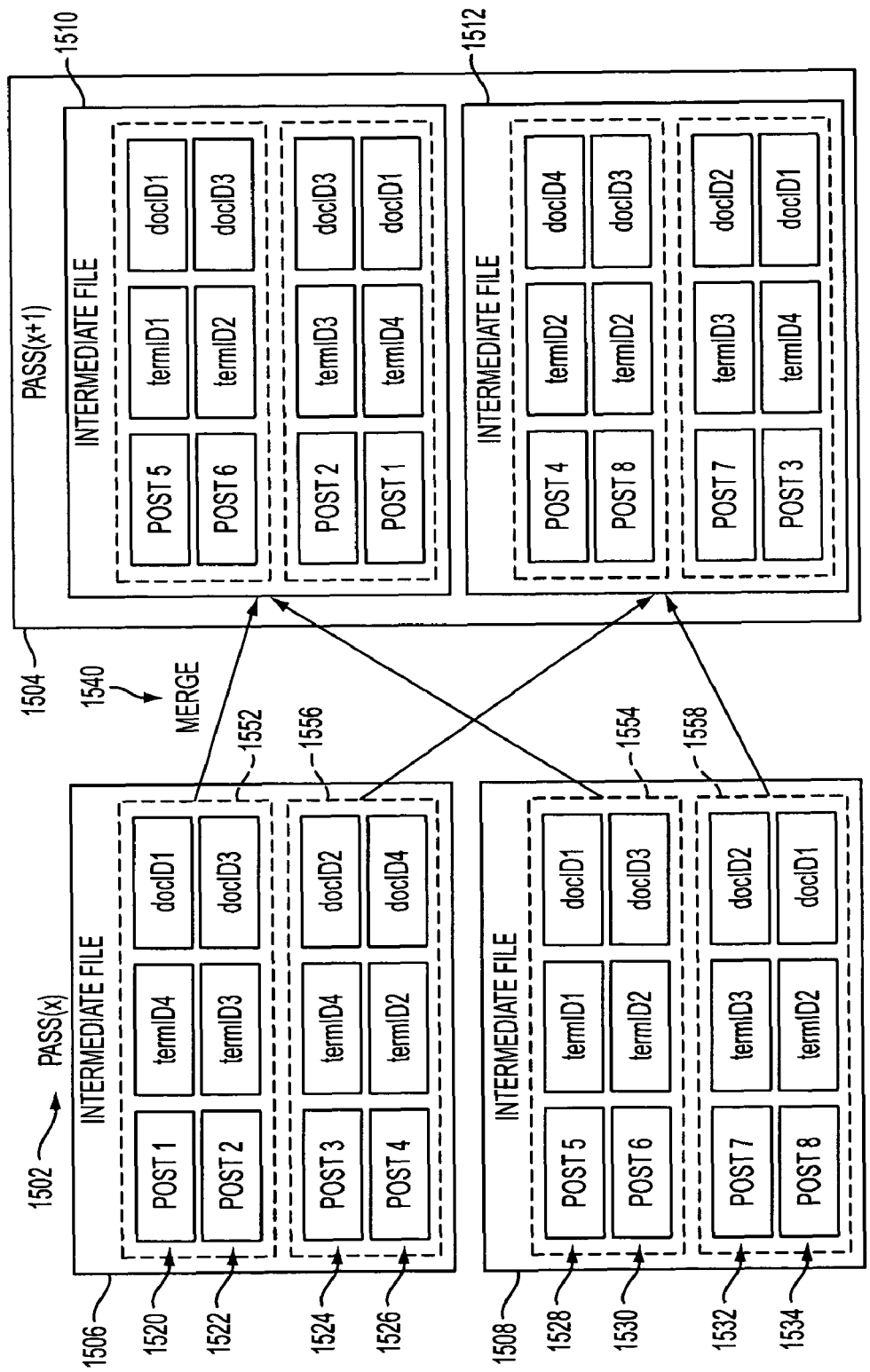
FIG. 15 is a block diagram illustrating a prior art method for inverting a computer index.

A method for processing the temporary posting file 1400 is illustrated with reference to FIG. 14 and the block diagram of an example temporary posting file 402 shown in FIG. 4. The method 1400 is implemented using a loop 1401 that begins with a start loop block 1402 and that executes intervening blocks 1404-1412 before reaching an end loop block 1414. The end loop block 1414 returns control to the start loop block 1402. The start loop block 1402 will continue execution by directing program control to block 1402 as long as postings 404-410 remain unprocessed in the temporary posting file 402. After all of the postings 404-410, or a selected subset of those postings, have been processed, the loop 1401 ends and program control moves from the start loop block 1402 to the loop complete block 1420, which returns control to 1214 shown in FIG. 12.

In a block 1404, the next posting 404-410 is read (FIG. 4). The term posting, for example, posting 404 includes the term ID 310 and a document ID 220. A decision block 1406 determines if the term ID 310 has been associated with one of the term posting spaces 510-516 in the current inversion buffer segment 504. If the term ID 310, has been associated with one of the term ID spaces 518-524 indicating that the term ID will be processed in another inversion buffer segment 804-812, the decision block 460 returns control to block 1404 where the next posting is read and the decision block 1406 is executed again. If the term ID 310 is associated with one of the term posting spaces 510-516, a block 1408 normalizes the term ID to reference the term ID space within the current inversion buffer segment 504. For example the term ID normalized equals the term ID current, last retrieved as term ID 310, minus the term ID start or normalizing value. The term ID normalized indicates the term posting space, for example, term posting space 514, the position of which is obtained by accessing the buffer offsets array 702 using the term ID normalized value as the index. In block 1410, the retrieved document ID 220 is inserted into the position reserved for the posting, for example, posting space 536. The inversion buffer position equals inversionBuffer[bufferOffsets[termIDnormalized]].

The inversion buffer position is then incremented in a block 412 to reflect the position for the next insertion of a reference. For example, the posting space for the next document ID 220 associated with the term posting space 514 would increment from posting space 536 to posting space 538. The entry 706 associated with the index position indicated by the normalize term ID is updated by incrementing the value in its offset field 713 to the value of the next posting space 538 in the inversion buffer segment 504. The method 1400 then continues by passing control to the end loop block 1414, which returns control to the beginning of the loop 1401 at start loop block 1402. Execution continues as described above.

Various of the above-disclosed and other features and functions, or alternatives thereof, may be desirably combined into many other different systems or applications. While the methods and the systems have been illustrated in many cases using functional flow diagrams to provide a clear description of reasonable length, it should be noted that these diagrams may unnecessarily imply that what is described is necessarily sequential in nature. Many times, however, the actual sequence is unimportant, as will be easily recognized by one of ordinary skill in the art. For the sake of brevity, all permutations possible for minor implementation details are not described, but are fully intended to be included in the spirit in scope of the description of the specification. Further, the claims can encompass embodiments in hardware, software, or a combination thereof. Various presently unforeseen or unanticipated alternatives, modifications, variations, or improvements therein may be subsequently made by those skilled in the art, which are also intended to be encompassed by the following claims.

What is claimed is:

1. A computer-implemented method for generating an ordered data set, comprising:
   providing a data set of tuples, each tuple comprising a key and a corresponding reference;
   determining the number of corresponding references in the data set of tuples that include each key;
   allocating an inversion buffer in a memory;
   allocating a key space in the inversion buffer for each key in the data set of tuples to be included in an ordered data set of tuples and associating that key with the key space;
   allocating a variable number of reference spaces in the key spaces, wherein one of the reference spaces in each key space is allocated for each reference that corresponds to the key associated with the key space from the determined number of corresponding references that include each key;
   associating the corresponding reference with the reference space allocated for that corresponding reference; and
   generating the ordered data set of the tuples based upon the positional relationship of the key spaces and the reference spaces.

2. The method of claim 1, further comprising ordering the key spaces in the inversion buffer according to a desired sort order.

3. The method of claim 2, further comprising associating each key space with a unique key.

4. The method of claim 2, further comprising saving the inversion buffer as an index file.

5. The method of claim 2, further comprising:
   combining a plurality of inversion buffer segments into the ordered data set of tuples; and
   ordering the plurality of inversion buffer segments according to the desired sort order.

6. The method of claim 5, further comprising sequentially processing the inversion buffer segments in the desired sort order and appending each inversion buffer segment to the ordered data set of tuples in the desired sort order.

7. A computer-readable media comprising program instructions implementing the method of claim 1.

8. A computer system including for generating an inverted index, the system comprising:
   a posting component that provides a plurality of postings parsed from a document corpus, each posting comprising a term reference and an associated document reference;
   a document reference frequency component that determines the number of postings in the plurality of postings that include the term reference;
   an inversion component, comprising;
      an inversion buffer allocation component that maps an inversion buffer in a memory to receive the plurality of postings in a pre-defined sort order;
      a posting sort component that associates each posting with the mapped location in the inversion buffer for that posting; and
      a document reference space allocation component that allocates a variable number of reference spaces, wherein one of the reference spaces in the mapped location is allocated for each of the number of postings associated with the term reference as determined by the document reference frequency component; and
   an index generation component that generates the inverted index from the mapping of the inversion buffer.

9. The system of claim 8, wherein the inversion buffer allocation component maps in the inversion buffer a term reference area associated with each term reference from the plurality of postings.

10. The system of claim 9, wherein the inversion buffer allocation component maps, in each term reference area, a document reference area for each document reference associated with the term reference that is associated with the term reference area by way of at least one posting.

11. The system of claim 10, wherein the inversion buffer allocation component maps the term reference area for only term references that are unique in the plurality of postings.

12. The system of claim 11, wherein the index generation component generates the inverted index by sequentially reading the inversion buffer as allocated by the inversion buffer allocation component and appending the read of the inversion buffer to the inverted index.

13. The system of claim 10, wherein:
the inversion buffer allocation component maps a single document reference area in the term reference area for each unique instance of a document reference associated with the term reference; and
the posting sort component associates only a single instance of a document reference with the single document reference area in the term reference area that is associated with the term reference with which the document reference is associated.

14. The system of claim 13, wherein the index generation component generates the inverted index by sequentially reading the inversion buffer as allocated by the inversion buffer allocation component and appending the read of the inversion buffer to the inverted index.

15. A computer-implemented method for inverting an index, the computer comprising a processor and a memory, the method comprising:
providing a plurality of postings to be indexed, each posting comprising a term identification and a document identification;
determining a set of unique term identifications present in the plurality of postings;
for each unique term identification in the set of unique term identifications, determining from the plurality of postings the number of document identifications that are associated with that unique term identification;
allocating an inversion buffer in memory;
allocating, in a predefined order, a term space in memory associated with the inversion buffer for each unique term identification;
allocating a variable number reference spaces in memory, wherein each reference space is associated with the term space for each document identification that is associated with the unique term identification that is associated with the term space based on the determined number of document identifications that are associated with the unique term identification;
for each posting in the set of postings, associating the document identification from that posting with one of the document spaces that is associated with the term space associated with the term identification of that posting; and
generating the index from the spatial relationships of the term spaces associated with the inversion buffer.

16. The method of claim 15, wherein generating the index from the spatial relationships of the term spaces associated with the inversion buffer comprises writing the key spaces to the index file as ordered in the inversion buffer.

17. The method of claim 16, further comprising writing a plurality of inversion buffer segments to the index file in a predefined order.

18. The method of claim 17, wherein at least one inversion buffer segment written to the index file is generated by another computer in a distributed computer environment.

19. A computer-readable media comprising program instructions implementing the method of claim 15.

20. A computer system for generating a computer-readable index, comprising:
a document corpus parsing component, comprising:
a posting component that adds a posting to a set of postings when a document in a corpus of documents contains a term, each posting comprising a term identifier and a document identifier associated with the document containing the term;
a document frequency component that determines the number of postings in the set of postings that include the term identifier;
a term lexicon component that administers a set of term identifiers;
an inversion buffer component, comprising:
an inversion buffer allocating component that allocates an inversion area in memory for inversion of a subset of postings from the set of postings;
a term space allocating component that allocates a term space for each term identifier in a subset of terms identifiers from the term lexicon such that the term spaces are arranged by a pre-defined sort order;
a reference space allocating component that allocates a variable number of reference spaces in the term spaces, wherein the reference spaces in each term space is allocated for the number of postings associated with the term identifier as determined by the document frequency component;
an inversion component, comprising:
a posting processing component that retrieves each posting and assigns the document identifier associated with that posting to one of the reference spaces associated with the term space that is associated with the term identifier associated with that posting;
an index generating component, comprising:
an inversion buffer conversion component that sequentially returns each term space in order and appends a term record to the index, each record associating the term identifier that is associated with the term space with the reference identifiers that have been assigned to the reference spaces associated with that term space.

21. The system of claim 20, further comprising:
a inversion buffer paging component that:
initializes an inversion buffer segment for a subset of lexicon terms;
retrieves a subset of term identifiers determined to fit in the inversion buffer segment;
processes each inversion buffer segment as recited in the preceding claim;
wherein the index generating component orders each inversion buffer segment in the index according to the pre-defined sort order.

22. The system of claim 21, wherein the subset of term identifiers are selected in the pre-defined sort order and the index file is assembled by sequentially appending the inversion buffer segment to the index file.

23. The system of claim 21, wherein at least one inversion buffer segment is processed on a different computer in a distributed network and that inversion buffer segment is combined into the index file.

* * * * *